(No Model.)
V. A. CRANDALL.
RAILWAY GATE.
No. 420,865. Patented Feb. 4, 1890.
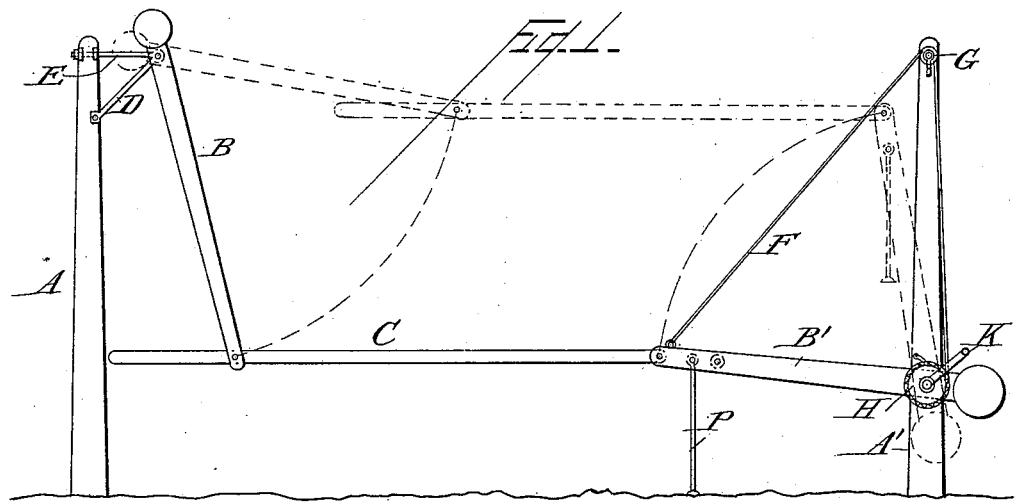
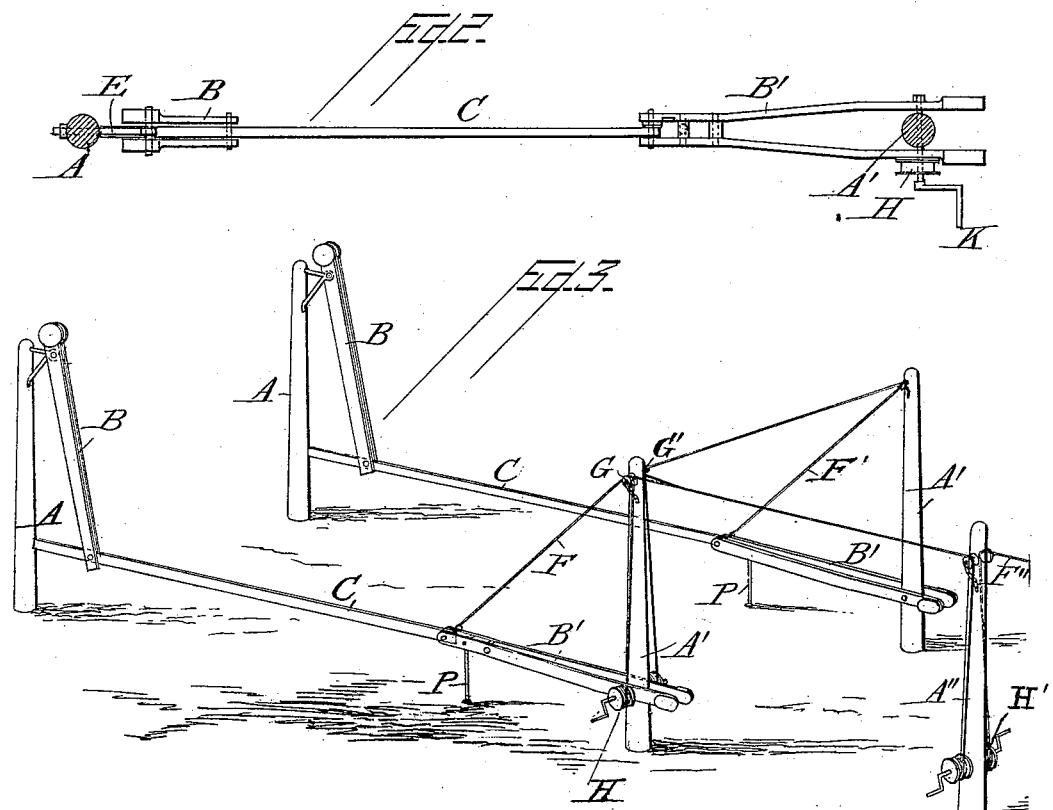
Attest:
F. H. Schott
W. L. Boyden
Inventor
Vincent A. Crandall
per John C. Tasker
Atty

UNITED STATES PATENT OFFICE.

VINCENT A. CRANDALL, OF SYRACUSE, NEW YORK.

RAILWAY-GATE.

SPECIFICATION forming part of Letters Patent No. 420,865, dated February 4, 1890.

Application filed June 20, 1889. Serial No. 315,024. (No model.)

*To all whom it may concern:*

Be it known that I, VINCENT A. CRANDALL, a citizen of the United States, residing at the city of Syracuse, in the county of Onondaga and State of New York, have invented a new and useful Improvement in Railroad-Gates, of which the following is a specification.

My invention relates to improvements in railroad-gates; and the object of my improvements is to furnish a gate which shall be simple in mechanism, and that said mechanism may be entirely out of the ground, cheap of construction, and labor-saving, for which purpose I have so arranged that one man may operate two or more gates. I attain this by the arrangement illustrated in the following drawings, in which—

Figure 1 is a side view of my invention. Fig. 2 is a sectional top view of the same. Fig. 3 is a view of the gates used each side of the railroad, and also illustrates the means by which I operate my gates at different street-crossings by one man stationed between the gates or at one of the gates.

Similar letters refer to similar parts throughout the several views.

A represents the post at the foot of the gate; B, an arm or lever open at the loaded end to move outside of its supports and of the post A and attached to the gate-bar C.

E and D are braces bolted to the post A at one end and coming together at less than a right angle where the arm or lever B is hinged or bolted to them.

C is the gate-bar supported by the arm or lever B at a distance from the end such that when the gate is closed the angle formed by the gate bar and arm or lever is less than a right angle.

A' is the hinge-post.

B' is an arm or lever bolted or hinged to the gate-bar and open at the loaded end to move outside the post A'.

G is a pulley at the top of the post A', over which the rope or chain for opening and closing the gate passes.

F is a rope or chain attached to the arm or lever B' near the gate-bar and passing over the pulley G to a windlass H, and P is the support upon which the arm B' rests when the gate is closed.

G' is also a pulley over which a rope or chain passes to the same windlass, and is connected to gate No. 2 when a gate is desired at each side of the crossing.

A'' is a post with windlass and pulleys to operate two or more gates at different crossings.

The method of operation in opening the gate when closed, as shown in Fig. 1, is by turning the crank, when the rope or chain over the pulley G raises the arm or lever B' toward the post A' and the gate-bar C, connected, as shown, to both arms or levers B' B, is lifted as shown in dotted lines in Fig. 1.

In operating the double gate the rope or chain F' may pass over the pulleys direct to windlass, as seen in Fig. 3; but I find it more convenient and less expensive to connect it with F at a point just below where F passes over the pulley G.

To operate gates at different crossings I place an operating-post A'' about half-way between the two gates, and with the aid of an additional windlass I accomplish the desired result, as shown in Fig. 3, with windlass H' and rope or cord F''.

The apparent advantage of my invention over other gates is that the mechanism is all above the ground, and so will not freeze up.

Having fully described my invention, what I claim is—

1. In a railway-gate, the combination of the post A, the loaded arm B, pivotally supported on a projection near the upper end of said post, the horizontal gate-bar C, to which the lower end of the arm B is pivoted, the post A', the arm or lever B', pivoted to the gate-bar and likewise to the post A', the support P, pivoted to the lever B', and the rope or chain F, all substantially as described.

2. In a railway-gate, the combination of the post A, the bracket secured thereto near the upper end, consisting of arms E and D, the loaded arm B, pivotally supported on said bracket, the horizontal gate-bar C, to which the lower end of the arm B is pivoted, the post A', the arm or lever B', hinged to the gate-bar C and likewise to the post A' toward the lower end thereof, the support P, pivotally connected to the lever B', the rope or chain F, connected to the end of lever B', running over a pulley G near the upper end of post A', and operated by a windlass H, all substantially as described.

VINCENT A. CRANDALL.

Witnesses:
M. M. MARA,
HOMER WESTON.